US009648021B2

(12) United States Patent
Tsai

(10) Patent No.: US 9,648,021 B2
(45) Date of Patent: May 9, 2017

(54) HTTPS CONTENT FILTERING METHOD AND DEVICE

(71) Applicant: HON HAI PRECISION INDUSTRY CO., LTD., New Taipei (TW)

(72) Inventor: Ming-Che Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 36 days.

(21) Appl. No.: 14/867,483

(22) Filed: Sep. 28, 2015

(65) Prior Publication Data
US 2017/0054722 A1  Feb. 23, 2017

(30) Foreign Application Priority Data

Aug. 19, 2015 (CN) .......................... 2015 1 0512023

(51) Int. Cl.
| | |
|---|---|
| *H04L 29/06* | (2006.01) |
| *H04L 29/08* | (2006.01) |
| *H04L 29/12* | (2006.01) |

(52) U.S. Cl.
CPC .......... *H04L 63/10* (2013.01); *H04L 61/1511* (2013.01); *H04L 61/2503* (2013.01); *H04L 63/0236* (2013.01); *H04L 67/02* (2013.01); *H04L 61/6004* (2013.01); *H04L 61/6068* (2013.01)

(58) Field of Classification Search
None
See application file for complete search history.

(56) References Cited

U.S. PATENT DOCUMENTS

| | | | | |
|---|---|---|---|---|
| 7,089,293 | B2 * | 8/2006 | Grosner ................. | H04L 29/06 370/364 |
| 2004/0039820 | A1 * | 2/2004 | Colby ................. | H04L 12/5695 709/226 |
| 2007/0214251 | A1 | 9/2007 | Li | |
| 2009/0126003 | A1 * | 5/2009 | Touboul .............. | H04L 29/1233 726/13 |
| 2012/0096261 | A1 * | 4/2012 | Ko ...................... | H04L 63/0236 713/168 |

(Continued)

FOREIGN PATENT DOCUMENTS

| | | |
|---|---|---|
| CN | 101141447 B | 8/2010 |
| CN | 101977235 B | 3/2013 |

(Continued)

*Primary Examiner* — Amir Mehrmanesh
(74) *Attorney, Agent, or Firm* — Steven Reiss

(57) ABSTRACT

A method for an HTTPS content filtering device includes forwarding a domain name resolution request from a client to a DNS server. One or more virtual IP addresses are generated, which correspond to one or more real IP addresses of a domain name resolution result received from the DNS server. The one or more virtual IP addresses are added to the domain name resolution result and sent to the client. When an HTTPS access request from the client is received, a real IP address corresponding to the virtual target IP address is determined, and the HTTPS access request is sent to an HTTPS server with the obtained real IP address. An HTTPS access result is received and filtered, and the virtual IP address is defined as the resource IP address for sending the filtered HTTPS access result to the client. An HTTPS content filtering device is also provided.

12 Claims, 3 Drawing Sheets

(56) References Cited

U.S. PATENT DOCUMENTS

2014/0089661 A1* 3/2014 Mahadik ............. H04L 61/1511
713/162
2015/0032691 A1* 1/2015 Hall ........................ H04L 29/06
707/610

FOREIGN PATENT DOCUMENTS

| TW | 200603575 | 1/2006 |
| TW | I291295 | 12/2007 |
| TW | 200822633 | 5/2008 |
| WO | 2005/060202 A1 | 6/2005 |

* cited by examiner

HTTPS CONTENT FILTERING METHOD AND DEVICE

CROSS-REFERENCE TO RELATED APPLICATIONS

This application claims priority to Chinese Patent Application No. 201510512023.5 filed on Aug. 19, 2015, the contents of which are incorporated by reference herein.

FIELD

The subject matter herein generally relates to data security and filtering.

BACKGROUND

HTTPS transmission protocol can improve the security of data, however, gateway devices will be unable to filter HTTPS content after encryption.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
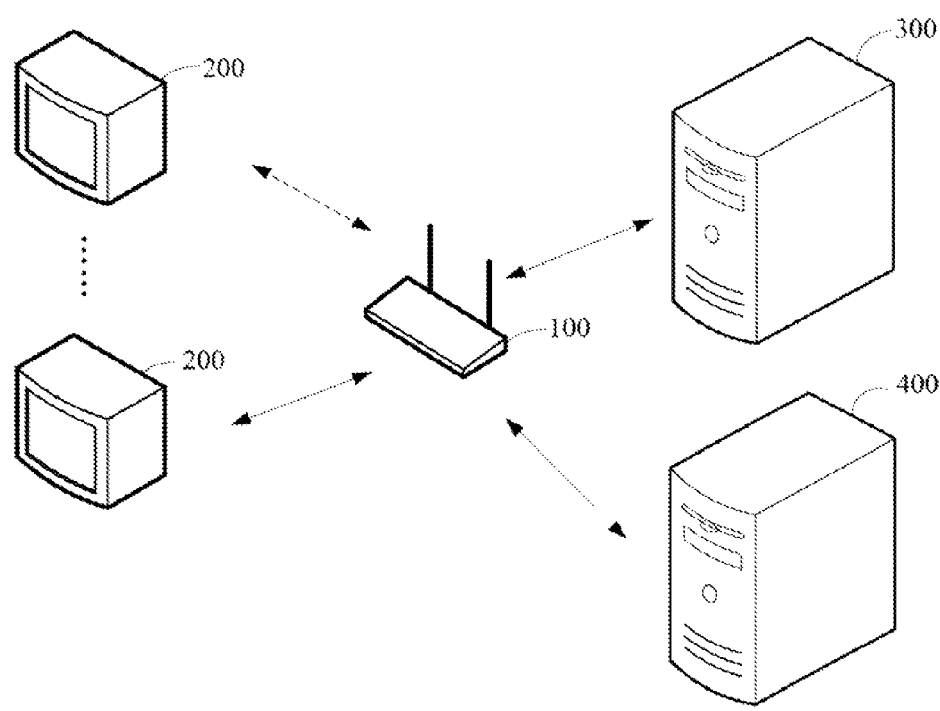
FIG. 1 is a diagram of one embodiment of an HTTPS content filtering device in an example environment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in details so as not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media includes CDs, DVDs, BLU-RAY, flash memory, and hard disk drives. The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows one embodiment of an HTTPS content filtering device 100 in an example environment. In at least one embodiment as shown in FIG. 1, the filtering device 100 is connected to at least one client 200, a domain name server (DNS) 300, and an HTTPS server 400. The filtering device 100 is configured to filter HTTPS content transmitted between the at least one client 200 and the HTTPS server 400.

Figure 2:
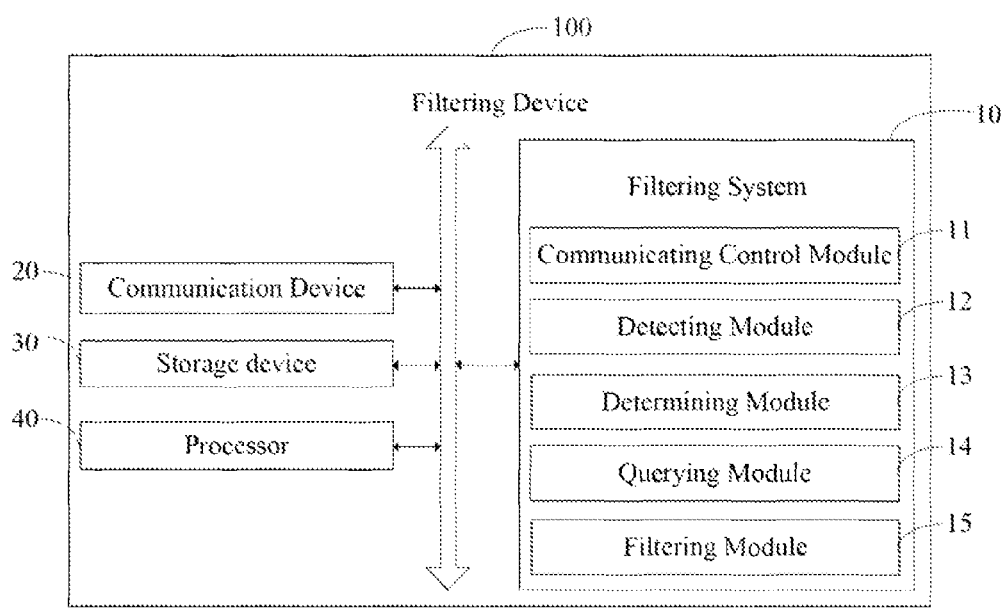
FIG. 2 is a block diagram of one embodiment of the HTTPS content filtering device of FIG. 1 including a filtering system.

FIG. 2 illustrates a block diagram of one embodiment of the HTTPS content filtering device 100 of FIG. 1. The filtering device 100 includes, but is not limited to, a filtering system 10, a communication device 20, a storage device 30, and at least one processor 40. FIG. 2 illustrates only one example of the filtering device 100, other examples can include more or fewer components than illustrated or have a different configuration of the various components in other embodiments.

In the illustrated embodiment, the communication device 20 can receive or send data. The storage device 30 can store data. In at least one embodiment, the storage device 30 can include various types of non-transitory computer-readable storage mediums. For example, the storage device 30 can be an internal storage system, such as a flash memory, a random access memory (RAM) for temporary storage of information, and/or a read-only memory (ROM) for permanent storage of information. The storage device 30 can also be an external system, such as a hard disk, a storage card, or a data storage medium. The at least one processor 40 can be a central processing unit (CPU), a microprocessor, or other data processor chip that performs functions of the filtering system 10 in the filtering device 100. In at least one embodiment, the filtering device 100 is a router.

The filtering system 10 can add virtual internet protocol (IP) addresses to a domain name resolution result for sending to a client 200, and forward a hypertext transfer protocol secure (HTTPS) access request to a HTTPS server 300 with a real IP address when receiving an HTTPS access request from the client 200. Thus, the filtering device 100 can filter an HTTPS access result from the HTTPS server 300 and send the filtered HTTPS content to the client 200.

In at least one embodiment, the filtering system 10 can include a communicating control module 11, a detecting module 12, a determining module 13, a querying module 14, and a filtering module 15. The function modules 11-15 can include computerized codes in the form of one or more programs which are stored in the storage device 30. The at least one processor 40 executes the computerized codes to provide functions of the function modules 11-15.

The communicating control module 11 controls the communication device 20 to forward to a DNS server 300 a domain name resolution request transmitted from the client 200. The DNS server 300 responds to the domain name resolution request and sends a domain name resolution result to the communication device 20.

The detecting module 12 detects whether one or more real IP addresses of the domain name resolution result are supportive of the HTTPS transmission protocol. If there are one or more real IP addresses which do support HTTPS transmission protocol, the communicating module 11 generates one or more virtual IP addresses corresponding to the one or more real IP addresses which are supportive.

In at least one embodiment, the detecting module 12 detects whether a real IP address supports the HTTPS transmission protocol by controlling the communication device 20 to send a handshake signal to port 443 of the real IP address, and then determining whether the communication device 20 receives a return or back signal from the real IP address within a first preset time. If the communication device 20 receives a back signal from a real IP address within the first preset time, the detecting module 12 determines that such a real IP address does support HTTPS transmission protocol. If the communication device 20 does not receive a back signal from a real IP address within the first preset time, the detecting module 12 determines that such a real IP address does not support HTTPS transmission protocol.

The communicating control module 11 adds the one or more virtual IP addresses to the domain name resolution result and sends the domain name resolution result and the one or more virtual IP addresses to the client 200. The communicating control module 11 further generates a relationship list which defines a relationship between the one or more virtual IP addresses and the one or more real IP addresses, to be stored in the storage device 30.

The determining module 13 obtains a target IP address of an HTTPS access request from the client 200 and determines whether the target IP address is a virtual IP address. If the target IP address is a virtual IP address, the querying module 14 queries the relationship list to determine a real IP address associated with the virtual target IP address. The communicating control module 11 controls the communication device 20 to send the HTTPS access request to an HTTPS server 400 with the real IP address. In the embodiment, the HTTPS server 400 responds to the HTTPS access request and sends an HTTPS access result to the communication device 20. If the target IP address is not a virtual IP address, the communicating control module 11 ignores the HTTPS access request, and the client 200 continues sending HTTPS requests to other IP addresses of the domain name resolution result according to the DNS institution. The determining module 13 continues making determinations as to whether the target IP address is a virtual IP address until a target IP address is found to be a virtual IP address.

The communicating control module 11 updates the virtual IP address and the real IP address in the relationship list. The determining module 13 determines whether there is a virtual IP address and a real IP address not being updated over a second preset time, and the communicating control module 11 deletes from the relationship list any relationship between a virtual IP address and a real IP address if such relationship is not updated within the second preset time.

The filtering module 15 filters the HTTPS access result from the HTTPS server 400 and the communicating control module 11 defines the virtual IP address as a source IP address when sending the filtered HTTPS access result to the client 200.

Figure 3:
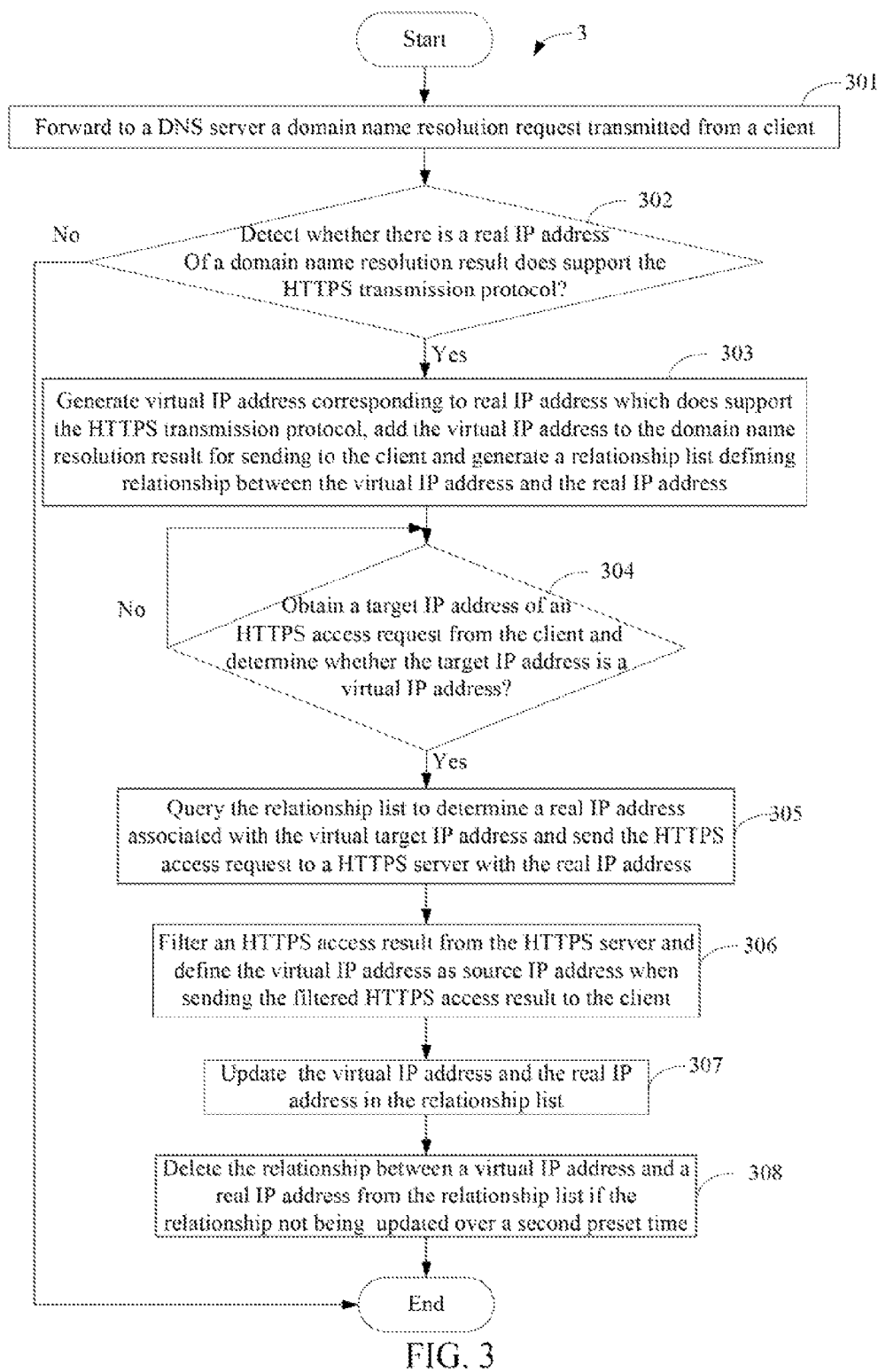
FIG. 3 illustrates a flowchart of one embodiment of a filtering method using the HTTPS content filtering device of FIG. 1.

Referring to FIG. 3, a flowchart of a filtering method is presented in accordance with an example embodiment. The example method 3 is provided by way of example, as there are a variety of ways to carry out the method. The example method 3 described below can be carried out using the configurations illustrated in FIG. 1 for example, and various elements of these figures are referenced in explaining example method 3. Each block shown in FIG. 2 represents one or more processes, methods, or subroutines carried out in the example method 3. Furthermore, the illustrated order of blocks is by example only and the order of the blocks can be changed. The example method 3 can begin at block 301. Depending on the embodiment, additional steps can be added, others removed, and the ordering of the steps can be changed.

At block 301, a communicating control module controls a communication device to forward a domain name resolution request from a client to a DNS server. The DNS server responds to the domain name resolution request and sends a domain name resolution result to the communication device.

At block 302, a detecting module detects whether one or more real IP addresses of the domain name resolution result are supportive of the HTTPS transmission protocol. If there is a real IP address supporting the HTTPS transmission protocol, block 303 is implemented. Otherwise, if there is no real IP address supporting the HTTPS transmission protocol, the flow is ended.

At block 303, the communicating module generates one or more virtual IP addresses corresponding to the one or more real IP addresses which do support the HTTPS transmission protocol. The one or more virtual IP addresses are added to the domain name resolution result for sending to the client and a relationship list is generated which defines a relationship between the one or more virtual IP addresses and the one or more real IP addresses, to be stored in the storage device.

At block 304, a determining module obtains a target IP address of an HTTPS access request from the client and determines whether the target IP address is a virtual IP address. If the target IP address is a virtual IP address, block 305 is complemented. If the target IP address is not a virtual IP address, the communicating control module ignores the HTTPS access request and continue to execute block 304 until a target IP address is found to be a virtual address.

At block 305, a querying module queries the relationship list to determine a real IP address associated with a virtual target IP address, and the communicating control module controls the communication device to send the HTTPS access request to an HTTPS server with the real IP address. In the embodiment, the HTTPS server responds to the HTTPS access request and sends an HTTPS access result to the communication device.

At block 306, a filtering module filters the HTTPS access result from the HTTPS server and the communicating control module defines the virtual IP address as the source IP address when sending the filtered HTTPS access result to the client.

At block 307, the communicating control module updates the virtual IP address and the real IP address in the relationship list.

At block 308, the determining module determines whether there is a virtual IP address and a real IP address not being updated over a second preset time, and the communicating control module deletes the relationship between a virtual IP address and a real IP address from the relationship list if the relationship is not updated within the second preset time.

With such a configuration, HTTPS content can be filtered between a client and an HTTPS server.

It should be emphasized that above-described embodiment of the present disclosure, including any particular embodiments, are merely examples of implementations set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A filtering device comprising:
   a communication device;
   at least one processor coupled to the communication device; and
   a non-transitory storage device that stores one or more programs which, when executed by the at least one processor, cause the at least one processor to:
   control the communication device to forward a domain name server resolution request transmitted from a client to a domain name server (DNS);
   generate one or more virtual internet protocol (IP) addresses corresponding to one or more real IP addresses of a domain name resolution result generated by the DNS server;
   add the one or more virtual IP addresses to the domain name resolution result;
   control the communication device to send the domain name resolution result and the added virtual IP address to the client;
   generate a relationship list, to be stored in the storage device, which defines a relationship between the one or more virtual IP addresses and the one or more real IP addresses;
   obtain a target IP address of a hypertext transfer protocol secure (HTTPS) access request from the client and determine whether the target IP address is a virtual IP address;
   upon a determination that the target IP address is a virtual IP address, query the relationship list to determine a real IP address associated with the virtual target IP address and control the communication device to send the HTTPS access request to an HTTPS server with the real IP address;
   filter a HTTPS access result generated by the HTTPS server and define the virtual IP address as source IP address when sending the filtered HTTPS access result to the client;
   update the virtual IP address and the real IP address in the relationship list after controlling the communication device to send the HTTPS access request to the HTTPS server with the real IP address;
   determine whether there is a virtual IP address and a real IP address not being updated over a second preset time; and
   delete from the relationship list any relationship between the virtual IP address and the real IP address if such relationship is not updated within the second preset time.

2. The device according to claim 1, wherein the at least one processor detects whether the one or more real IP addresses of the domain name resolution result are supportive of the HTTPS transmission protocol, and generates one or more virtual IP addresses corresponding to the one or more real IP addresses which are supportive.

3. The device according to claim 2, wherein the at least one processor detects whether the one or more real IP addresses of the domain name resolution result are supportive of the HTTPS transmission protocol by:
   controlling the communication device to send a handshake signal to port 443 of a real IP address;
   determining whether the communication device receives a return or back signal from the real IP address within a first preset time;
   determining that such a real IP address does support HTTPS transmission protocol if the communication device receives a back signal within the first preset time; and
   determining that such a real IP address does not support HTTPS transmission protocol if the communication device does not receive a back signal within the first preset time.

4. The device according to claim 1, wherein the at least one processor ignores HTTPS access request if the target IP address of the HTTPS access request is a real IP address.

5. A computer-implemented filtering method used in a filtering device being executed by a processor of the filtering device, the method comprising:
   controlling a communication device of the filtering device to forward a domain name server resolution request transmitted from a client to a domain name server (DNS);
   generating one or more virtual internet protocol (IP) addresses corresponding to one or more real IP addresses of a domain name resolution result generated by the DNS server;
   adding the one or more virtual IP addresses to the domain name resolution result;
   controlling the communication device to send the domain name resolution result and the added virtual IP address to the client;
   generating a relationship list, to be stored in a storage device of the filtering device, which defines a relationship between the one or more virtual IP addresses and the one or more real IP addresses;
   obtaining a target IP address of a hypertext transfer protocol secure (HTTPS) access request from the client and determining whether the target IP address is a virtual IP address;
   upon a determination that the target IP address is a virtual IP address, querying the relationship list to determine a real IP address associated with the virtual target IP address and controlling the communication device to send the HTTPS access request to an HTTPS server with the real IP address;
   filtering a HTTPS access result generated by the HTTPS server and defining the virtual IP address as source IP address when sending the filtered HTTPS access result to the client;
   updating the virtual IP address and the real IP address in the relationship list after controlling the communication device to send the HTTPS access request to the HTTPS server with the real IP address;
   determining whether there is a virtual IP address and a real IP address not being updated over a second preset time; and
   deleting from the relationship list any relationship between the virtual IP address and the real IP address if such relationship is not updated within the second preset time.

6. The method according to claim 5, wherein generating one or more virtual IP addresses corresponding to one or more real IP addresses of the domain name resolution result comprising:

detecting whether one or more real IP addresses of the domain name resolution result are supportive of the HTTPS transmission protocol; and generating one or more virtual IP addresses corresponding to the one or more real IP addresses which are supportive.

7. The method according to claim 6, wherein detecting whether one or more real IP addresses of the domain name resolution are supportive of the HTTPS transmission protocol comprising:

controlling the communication device to send a handshake signal to port 443 of a real IP address;

determining whether the communication device receives a return or back signal from the real IP address within a first preset time;

determining that such a real IP address does support HTTPS transmission protocol if the communication device receives a back signal within the first preset time; and determining that such a real IP address does not support HTTPS transmission protocol if the communication device does not receive a back signal within the first preset time.

8. The method according to claim 5, further comprising ignoring HTTPS access request if the target IP address of the HTTPS access request is a real IP address.

9. A non-transitory storage medium having stored thereon instructions that, when executed by a processor of a filtering device, causes the processor to perform a filtering method, the method comprising:

controlling a communication device of the filtering device to forward a domain name server resolution request transmitted from a client to a domain name server (DNS);

generating one or more virtual internet protocol (IP) addresses corresponding to one or more real IP addresses of a domain name resolution result generated by the DNS server;

adding the one or more virtual IP addresses to the domain name resolution result;

controlling the communication device to send the domain name resolution result and the added virtual IP address to the client;

generating a relationship list, to be stored in a storage device of the filtering device, which defines a relationship between the one or more virtual IP addresses and the one or more real IP addresses;

obtaining a target IP address of a hypertext transfer protocol secure (HTTPS) access request from the client and determining whether the target IP address is a virtual IP address;

upon a determination that the target IP address is a virtual IP address, querying the relationship list to determine a real IP address associated with the virtual target IP address and controlling the communication device to send the HTTPS access request to an HTTPS server with the real IP address;

filtering a HTTPS access result generated by the HTTPS server and defining the virtual IP address as source IP address when sending the filtered HTTPS access result to the client;

updating the virtual IP address and the real IP address in the relationship list after controlling the communication device to send the HTTPS access request to the HTTPS server with the real IP address;

determining whether there is a virtual IP address and a real IP address not being updated over a second preset time; and deleting from the relationship list any relationship between the virtual IP address and the real IP address if such relationship is not updated within the second preset time.

10. The non-transitory storage medium according to claim 9, wherein generating one or more virtual IP addresses corresponding to one or more real IP addresses of the domain name resolution result comprising:

detecting whether one or more real IP addresses of the domain name resolution result are supportive of the HTTPS transmission protocol; and generating one or more virtual IP addresses corresponding to the one or more real IP addresses which are supportive.

11. The non-transitory storage medium according to claim 10, wherein detecting whether one or more real IP addresses of the domain name resolution result are supportive of the HTTPS transmission protocol comprising:

controlling the communication device to send a handshake signal to port 443 of a real IP address;

determining whether the communication device receives a return or back signal from the real IP address within a first preset time;

determining that such a real IP address does support HTTPS transmission protocol if the communication device receives a back signal within the first preset time; and determining that such a real IP address does not support HTTPS transmission protocol if the communication device does not receive a back signal within the first preset time.

12. The non-transitory storage medium according to claim 9, wherein the method further comprising ignoring HTTPS access request if the target IP address of the HTTPS access request is a real IP address.

* * * * *